(12) United States Patent
Minixhofer et al.

(10) Patent No.: US 12,524,660 B2
(45) Date of Patent: Jan. 13, 2026

(54) IMPLEMENTING A MULTI-LAYER NEURAL NETWORK USING A SINGLE PHYSICAL LAYER OF ANALOG NEURONS

(71) Applicant: ams-Osram AG, Premstaetten (AT)

(72) Inventors: Benjamin Minixhofer, Eindhoven (NL); Bernhard Puchinger, Eindhoven (NL); Ernst Haselsteiner, Eindhoven (NL); Florian Maier, Eindhoven (NL); Gilbert Promitzer, Eindhoven (NL); Philipp Jantscher, Eindhoven (NL)

(73) Assignee: ams-Osram AG (AT)

( * ) Notice: Subject to any disclaimer, the term of this patent is extended or adjusted under 35 U.S.C. 154(b) by 1066 days.

(21) Appl. No.: 17/415,349

(22) PCT Filed: Dec. 10, 2019

(86) PCT No.: PCT/EP2019/084480
§ 371 (c)(1),
(2) Date: Jun. 17, 2021

(87) PCT Pub. No.: WO2020/126692
PCT Pub. Date: Jun. 25, 2020

(65) Prior Publication Data
US 2022/0058472 A1    Feb. 24, 2022

Related U.S. Application Data

(60) Provisional application No. 62/834,719, filed on Apr. 16, 2019, provisional application No. 62/782,204, filed on Dec. 19, 2018.

(51) Int. Cl.
*G06N 3/065* (2023.01)

(52) U.S. Cl.
CPC .................. *G06N 3/065* (2023.01)

(58) Field of Classification Search
CPC ................ G06N 3/065; G06N 3/08
See application file for complete search history.

(56) References Cited

U.S. PATENT DOCUMENTS

| 5,131,072 A | * | 7/1992 | Yoshizawa | G06N 3/065 |
| | | | | 706/38 |
| 5,220,559 A | * | 6/1993 | Tsuzuki | G06N 3/04 |
| | | | | 708/800 |

(Continued)

FOREIGN PATENT DOCUMENTS

| CN | 103201610 A | 7/2013 |
| CN | 107454965 A | 12/2017 |
| CN | 107679622 A | 2/2018 |

OTHER PUBLICATIONS

F. N. Sibai and S. D. Kulkarni, "A time-multiplexed reconfigurable neuroprocessor," in IEEE Micro, vol. 17, No. 1, pp. 58-65, Jan.-Feb. 1997, doi: 10.1109/40.566208 (Year: 1997).*

(Continued)

*Primary Examiner* — Markus A. Vasquez
(74) *Attorney, Agent, or Firm* — VIERING, JENTSCHURA & PARTNER mbB (57) ABSTRACT

A system including a multi-layer analog neural network that has a single layer of physical analog neurons that is re-usable for implementing a plurality of layers of the multi-layer analog neural network. Each of the physical analog neurons is configured to receive a neuron input and to process the neuron input to generate a neuron output that is fed as input to all physical analog neurons of the single layer, and each of the physical analog neurons includes a respective weight memory. The system controller is operable to obtain, for each physical analog neuron, a respective set of neuron weight vectors with each neuron weight vector corresponding to a respective layer of the plurality of layers of the multi-layer analog neural network; store, for each physical (Continued)

analog neuron, the respective set of neuron weights in the respective weight memory of the physical analog neuron.

20 Claims, 4 Drawing Sheets

(56) References Cited

U.S. PATENT DOCUMENTS

| | | |
|---|---|---|
| 2014/0188771 A1 | 7/2014 | Modha |
| 2017/0330069 A1* | 11/2017 | Liu .................. G06N 3/063 |
| 2018/0039883 A1 | 2/2018 | Kurata |
| 2020/0117984 A1* | 4/2020 | Li .................. G11C 11/54 |
| 2022/0138577 A1 | 5/2022 | Young |

OTHER PUBLICATIONS

Sibai F N et al: "A Time-Multiplexed Reconfigurable Neuroprocessor", IEEE Micro, IEEE Service Center, Los Alamitos, CA, US, vol. 17, No. 1, Jan. 1, 1997 (Jan. 1, 1997), pp. 58-65, XP000642697, ISSN: 0272-1732, DOI: 10.1109/40.566208 abstract p. 59, left-hand column, line 41-p. 61, left-hand column, line 40 figures 5, 6.
Chinese search report issued for the corresponding Chinese patent application No. 2019800841864, dated Feb. 5, 2024, 1 page (for informational purpose only).

* cited by examiner

IMPLEMENTING A MULTI-LAYER NEURAL NETWORK USING A SINGLE PHYSICAL LAYER OF ANALOG NEURONS

RELATED APPLICATIONS

The present invention is a U.S. National Stage under 35 USC 371 patent application, claiming priority to Serial No. PCT/EP2019/084480, filed on 10 Dec. 2019; which claims priority of U.S. Provisional Application Ser. No. 62/782,204, filed on 19 Dec. 2018; and U.S. Provisional Application Ser. No. 62/834,719, filed on 16 Apr. 2019, the entirety of which are incorporated herein by reference.

BACKGROUND

Neural networks are machine learning models that employ one or more layers of nonlinear units to predict an output for a received input. Some neural networks include an input layer, an output layer, and one or more hidden layers in between. Each layer includes one or more neurons. Each neuron of a particular layer is connected to all neurons of the preceding layer and to all neurons of the subsequent layer. The output of each layer is used as input to the next layer in the network, i.e., the next hidden layer or the output layer. Each layer of the network generates an output from a received input in accordance with current values of a respective set of weights.

SUMMARY

This specification describes techniques for implementing a multi-layer analog neural network using a single layer of physical analog neurons.

In general, one innovative aspect of the subject matter described in this specification can be embodied in a system that includes a multi-layer analog neural network and a system controller. The multi-layer analog neural network has a single layer of physical analog neurons that is re-usable for implementing a plurality of layers of the multi-layer analog neural network. Each of the physical analog neurons is configured to receive a neuron input and to process the neuron input to generate a neuron output that is fed as input to all physical analog neurons of the single layer, and each of the physical analog neurons includes a respective weight memory. The weight memory in each of the physical analog neurons of the single layer is stored in random access memory (RAM).

The system controller obtains, for each physical analog neuron, a respective set of neuron weight vectors with each neuron weight vector corresponding to a respective layer of the plurality of layers of the multi-layer analog neural network. A neuron weight vector includes multiple neuron weights. Each neuron weight has an integer value. The system controller stores, for each physical analog neuron, the respective set of neuron weights in the respective weight memory of the physical analog neuron; receive a network input for the multi-layer analog neural network; and processes the network input through the plurality of layers to generate a network output by repeatedly using the single layer of physical analog neurons. For each layer of the plurality of layers, each of the physical analog neurons uses a neuron weight vector in the respective set of neuron weight vectors that corresponds the current layer to process the neuron input of the physical analog neuron.

To process the network input through the plurality of layers to generate the network output by repeatedly using the single layer of physical analog neurons, the system controller executes a plurality of calculation cycles with each calculation cycle corresponding to a respective layer of the plurality of layers. For each calculation cycle, the system controller causes the neuron controller of each physical analog neuron of the single layer to synchronously (i) load a neuron weight vector corresponding to the current layer to the analog computing unit, and (ii) load a neuron input of the physical analog neuron for the current layer to the analog computing unit. The system controller then causes the analog computing unit of each physical analog neuron to compute a neuron output using the loaded neuron weight vector and the loaded neuron input for the physical analog neuron; and causes the neuron controller of each physical analog neuron to provide the computed neuron output of the physical analog neuron as input to all physical analog neurons of the single layer for the next calculation cycle.

Before computing a respective neuron output, the analog computing unit of each physical analog neuron converts the loaded neuron input from a digital format to an analog format using a Digital-to-Analog Converter (DAC), and uses the converted neuron input in analog format for the computation. To compute the respective neuron output, the analog computing unit of each physical analog neuron applies a non-linear function on the loaded neuron weight vector and the converted analog neuron input for the physical analog neuron (in analog format). Once the respective neuron output of each neuron is obtained, the analog computing unit provides the respective neuron output to all physical analog neurons of the single layer for the next calculation cycle. At the last calculation cycle corresponding to the last layer of the plurality of layers, the analog computing unit of each physical analog neuron converts the neuron output from the analog format to a digital format using an Analog-to-Digital Converter (ADC).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Neural networks are widely used to perform machine learning tasks such as pattern recognition or classification tasks. A neural network generally includes an input layer, an output layer, and one or more hidden layers in between. Each layer includes one or more neurons. Each neuron of a particular layer is connected to all neurons of the preceding layer and to all neurons of the subsequent layer. Each of these connections has a respective weight. The output of each layer is used as input to the next layer in the neural network, i.e., the next hidden layer or the output layer. Each layer of the neural network generates an output from a received input in accordance with current values of a respective set of weights of the layer.

Once input data is provided to the input layer of the neural network, the data is propagated through the whole neural network along the weighted connections. That is, the neural network processes the input data through each of the layers and obtains the output of the output layer as the final output of the neural network. The final output includes outputs generated by neurons of the output layer, where the output of each neuron may represent one of a set of classes (or categories) that the input data could be assigned to. The neuron that has an output with the highest value may signal a result (e.g., a classification result, a regression result, etc.) achieved by the neural network for the given input data.

In order for the neural network to learn to perform a machine learning task, a large number of pre-classified training examples are needed to train the neural network. Each training example includes a training input and a respective ground-truth output for the training input. Each training input is processed by the neural network to generate a respective output. The output generated by neural network is then compared to the respective ground-truth output of the training input. During training, the values of weights (or parameters) of the neural network are adjusted such as the outputs generated by the neural network gets closer to the ground-truth outputs. This training procedure is repeated multiple times for all pre-classified training examples until one or more criteria are satisfied, for example, until the neural network has achieved a desired level of accuracy.

Traditionally, most implementations of neural networks are software implementations, where the neural networks and their corresponding neurons do not exist physically. Instead, these neural networks are computer programs executed by a digital processor and can be referred to as digital neural networks. Digital neural networks are implemented in a software-based environment, thus they require a general purpose processor such as CPU or GPU to train and execute a neural network model. Such general purpose processor is not available in many applications such as embedded systems or sensors. Further, because computations performed by digital neural networks are digital computations, digital neural networks consume large computational resources and may be slow for high-performing tasks that require real-time or near real-time responses (e.g., robotic hand manipulation tasks, or self-driving car navigation tasks).

To overcome the drawbacks of digital neural networks, this specification describes techniques for implementing an analog neural network that is built with analog components that physically exist. The calculations required for the propagation of the data through the analog neural network are at least partially performed as analog computations without the need of a digital processor. Thus, the described analog neural network has the following technical advantages over conventional digital neural networks:

High parallelism as all neurons can operate at the same time
Fast execution as calculations are simple analog operations
Low power consumption due to the efficient data processing
Applicable for embedded systems and sensors as no CPU or GPU is required Further, the techniques described herein allows implementations of a multi-layer analog neural network by repeatedly using a single layer of physical analog neurons. The ability to create an analog neural network that has a single layer of physical analog neurons but can work as a multi-layer neural network provides greater flexibility and scalability (compared to existing methods for implementing analog neural networks) as described below.

Flexibility

When solving a problem using a neural network, it may not clear which neural network architecture would fit best for the given problem. The neural network architecture is typically determined based on experience with similar problems and by automated trial-and-error methods. The number of hidden layers and neurons per hidden layer often varies for different problems. Existing methods build an analog neural network with a fixed number of physical layers to solve one or more problems, thus deterring changes to the architecture of the analog neural network later when needed. This makes the analog neural network less useful or unusable in many cases. For example, when a problem requires fewer layers, the analog neural network becomes too big and computationally inefficient. As another example, when a problem requires more layers, the analog neural network cannot achieve good results due to the lack of layers. In contrast, the techniques described in this specification repeatedly use a single layer of physical analog neurons to create a multi-layer analog neural network. Therefore, the number of layers in the analog neural network can be easily customized/adjusted for a specific task, leading to higher performance and higher computational efficiency compared to analog neural networks with a fixed number of physical layers.

In addition, while the single layer of physical analog neurons has a constant number of physical analog neurons (for example, k neurons), the unique architecture of the multi-layer analog neural network allows for:

Any number of input neurons up to k (input and output neurons could overlap),
Any number of output neurons up to k (input and output neurons could overlap),
Any number of hidden neurons up to k in each layer (in case a layer needs fewer than n neurons, the corresponding weights can be set to zero), and
Any number of layers up to an amount of memory available to store the weights per layer.

Scalability

Building a physical analog neural network may be challenging due to the large number of connections between neurons. Two layers of m and n neurons need m times n of weighted connections. Therefore, solving a problem using an analog neural network with tens or hundreds of layers would require thousands of physical connections with weights. The large number of required physical connections limits a physical implementation of the analog neural network, as it would result in an extremely large chip.

By implementing a multi-layer analog neural network by repeatedly using a single layer of physical analog neurons, the techniques described herein allows the multi-layer analog neural network to be scaled up to ten, hundreds or thousands of layers without increasing the size of the chip that contains the analog neural network. This scalability would in turns allow for manufacturing sensors or embedded devices that are compact but have high performance (e.g., high accuracy and fast processing time).

Depending on the task, the multi-layer analog neural network described in this specification can be configured to receive any kind of digital data input and to generate any kind of score, classification, or regression output based on the input. For example, if the inputs to the multi-layer analog neural network are images or features that have been extracted from images, the output generated by the multi-layer analog neural network for a given image may be scores for each of a set of object categories, with each score representing an estimated likelihood that the image contains an image of an object belonging to the category.

Further, the multi-layer analog neural network described herein can be used to perform other tasks such as estimating a concentration of gas in the air, estimating fat contents of a chocolate based on a measured spectrum, detecting an environment (e.g. an environment where an airplane or a train is operated/located) based on sound measurements.

Figure 1:
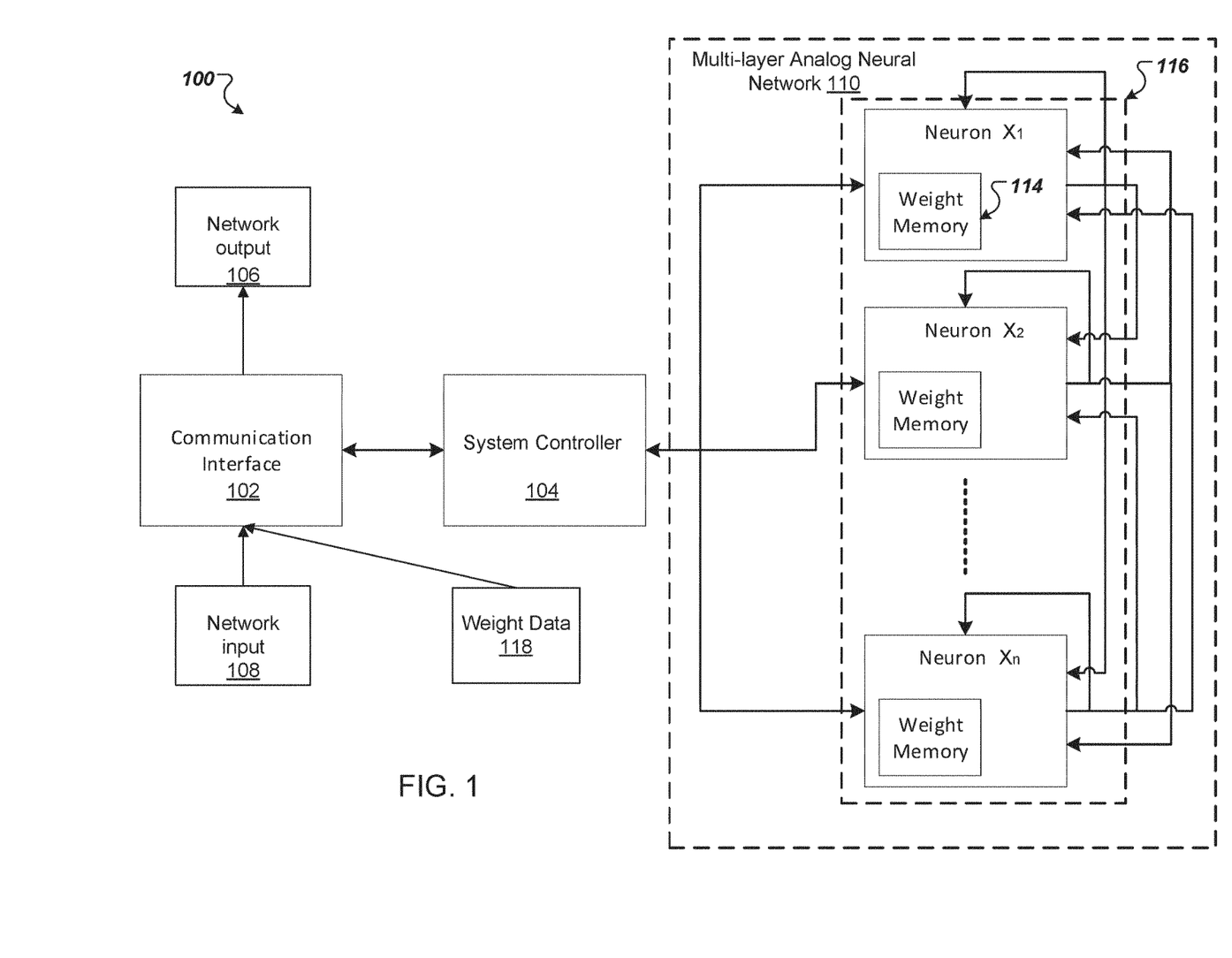
FIG. 1 shows an architecture of an example chip that includes a multi-layer analog neuron network implemented by a single layer of physical analog neurons.

FIG. 1 shows an architecture of an example chip 100 that includes a multi-layer analog neuron network implemented by a single layer of physical analog neurons.

The chip 100 includes a multi-layer analog neural network 110 (hereafter referred to as network 110 for simplicity), a communication interface 102, and a system controller 104.

The network 110 has a single layer 116 of physical analog neurons $\{X_1, X_2, \ldots, X_n\}$. The single layer 116 of physical analog neurons is re-usable for implementing multiple layers of the network 110. Generally, each of the physical analog neurons is configured to receive a neuron input and to process the neuron input to generate a neuron output. The neuron output is then fed as input to all physical analog neurons of the single layer. Each of the physical analog neurons includes a respective weight memory for storing weights that are used by the neuron to compute neuron outputs given neuron inputs. For example, the analog neuron $X_1$ has a weight memory 114.

One or more analog neurons in the single layer 116 can act as input neurons that are configured to receive the network input 108 (external input). When the single layer 116 of physical analog neurons is used as the first layer of the network 110, at least one neuron acts as an input neuron, but up to all neurons could work as input neurons. For analog neurons that do not work as analog neurons, the input to these analog neurons are set to zero. For layers following the first layer, the inputs to all neurons that may work as input neurons are set to zero.

The communication interface 102 connects the multi-layer analog neural network 110 to a computer (or any computing device). The communication interface 102 controls operations of the network 110 (e.g. how many layers shall be calculated) through the system controller 104. The communication interface 102 can be, for example, I2C Bus. The communication interface 102 receives network input 108 from the computer and provides network input 108 to the network 110 through the system controller 104. Once the network 110 processes the network input 108 to generate a network output 106, the communication interface 102 retrieves the network output 106 of the network 110 through the system controller 104. The communication interface 102 then provides the network output 106 to the computer.

The communication interface 102 receives weight data 118 from the computer and transmits the weight data 118 to the system controller 104. The weight data 118 includes, for each neuron of the physical layer 116 of neurons, a respective set of weight vectors with each neuron weight vector corresponding to a respective layer in multiple layers of the network 110. The weight data 118 can be obtained by training a digital neural network that is a simulated version of the network 110 on a digital processor. In some implementations where the network 110 is integrated in a sensor chip, the communication interface 102 can be an internal interface of the sensor chip.

The system controller 104 is a digital circuit configured to receive commands from the computer through the interface 102. The system controllers 104 is configured to keep track and change states of the network 110, e.g., change from a state corresponding to one layer of the network 110 to another state corresponding to the next layer of the network 110. When changing states (also referred to as calculation cycles) of the network 110, the system controller 104 causes a generation of digital signals to control the physical analog neurons of the single layer 116.

More specifically, the system controller 104 is configured to receive the weight data 118 from the interface 102. The system controller 104 loads each set of neuron weight vectors in the weight data 118 to an appropriate analog neuron. Each analog neuron stores its respective set of neuron weight vectors in its weight memory. Each neuron weight vector in the set corresponds to a respective layer of multiple layers of the network 110. That is, if the network 110 has p layers, then each analog neuron has a respective set of p neuron weight vectors, with each vector being used by the analog neuron for computing a neuron output for the corresponding layer.

By allowing each neuron of the physical layer 116 stores different neuron weight vectors for different layers of the network 110, the techniques described herein allow for the implementation of multiple layers in the network 110 using the single physical layer 116. Depending on the currently calculated layer, which is controlled by the system controller 104, each neuron can retrieve, from its respective weight memory, a weight vector that is assigned for the current layer in order to compute a neuron output for a given neuron input for the current layer.

To compute a neuron output for a given neuron input, a neuron performs a calculation of the following function:

$$\text{Output} = f(\Sigma_{i=1}^{n} w_{ki} * \text{Input}_i) \qquad \text{(Eq. 1)}$$

where Output is the output produced by the neuron. f is a non-linear function. For example, f can be a linear function such as f(x)=x, but the result of the linear function is limited to a maximum of +1 and a minimum of −1. That means, when the value of f(x) is greater than or equal to 1, the value of f(x) is set to +1. When the value of f(x) is less than −1, the value of f(x) is set to −1. Therefore, f is a non-linear function. n is the total number of neurons. n can be, for example, an integer between 2 and 1000. $w_{ki}$ is the weight between neuron $X_i$ and neuron $X_k$. $\text{Input}_i$ is the input value coming from neuron $X_i$.

As shown in FIG. 1, the neuron output of each neuron is one of the inputs of all other neurons including the neuron itself. In addition, each neuron has an additional input, which can be directly set by the system controller 104. This additional input is used to provide external inputs (e.g., the network input 108) to neurons.

The weights of each neuron are stored in a weight memory, which is part of the neuron. The architecture of a physical analog neuron is described in more detail below with reference to FIG. 2.

In order to perform a full neural network operation with multiple layers, the system controller 104 executes a plurality of calculation cycles with each calculation cycle corresponding to a respective layer of the multiple layers of the network 110. That is, if the network 110 has p layers, the system controller 104 executes p calculation cycles.

At each calculation cycle, each of the neuron outputs generated by the neurons $X_1, \ldots, X_n$ is fed as input to all analog neurons of the single layer 116 for using in the next calculation cycle. After the last calculation cycle (corresponding to the output layer of the network 110) is performed, the obtained neuron outputs (collectively referred to as the network output 106) are transmitted to the communication interface 102 by the system controller 104. The communication interface 102 then provides the network output 106 to the computer.

Executing each calculation cycle is described in more detail below with reference to FIG. 2.

Figure 2:
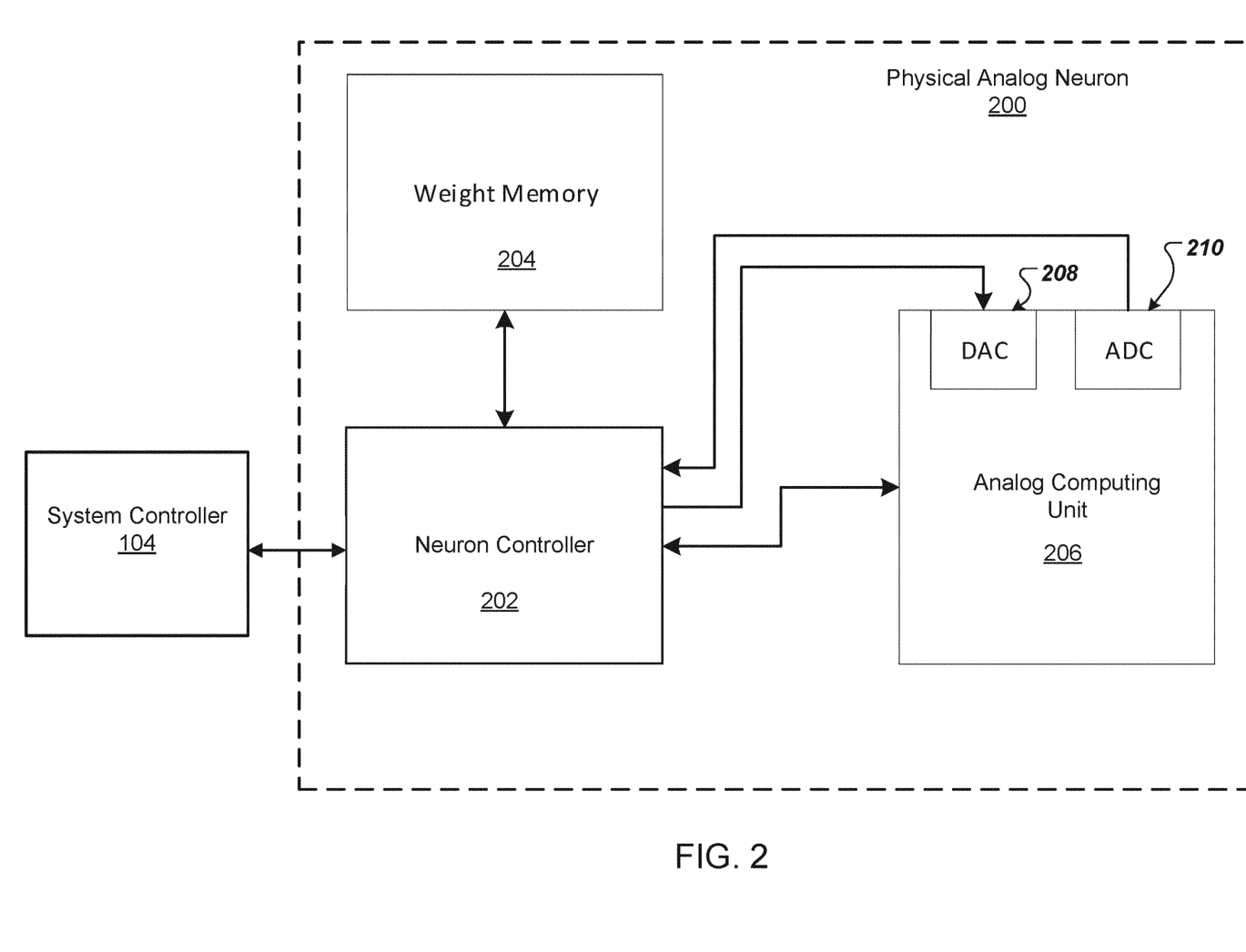
FIG. 2 illustrates an architecture of an example physical analog neuron.

FIG. 2 illustrates an architecture of a physical analog neuron 200. As discussed above, the single layer 116 of physical analog neurons in FIG. 1 includes k physical analog neurons, each neuron having the same architecture as the physical analog neuron 200.

The physical analog neuron 200 includes a neuron controller 202, a weight memory 204, and an analog computing unit 206. The neuron controller 202 is a digital component such as a computer program. The weight memory 204 is also a digital component.

The neuron controller 202 is connected to the system controller 104 of FIG. 1. The neuron controller 202 is a digital circuit that is configured to receive digital signals from the system controller 104. Based on the digital signals from the system controller 104, which indicate the current state (or calculation cycle) of the network 110, the neuron controller 202 generates signals to control the analog computing unit 206. It is note that connections between analog outputs and analog inputs of one neuron as well as between all other neurons are analog links and do not interfere with the neuron controller 202 or system controller 104. The analog computing unit 206 is an analog circuit which implements the mechanism to multiply the inputs with the weights and sum up such products (weight*input) for all inputs to neuron. Also, it implements the buffer to store the analog output and make it available as input to the next layer calculation.

The system controller 104 executes the calculation cycles and is therefore aware of the current layer that is being calculated. At the beginning of each calculation cycle, the system controller 104 send data identifying the current layer to the neuron controller of each neuron of the single layer 116. Based on the data identifying the current layer, the neuron controller (for example, the neuron controller 202) of each neuron then reads the proper neuron weight vector from the weight memory of the same neuron. The proper neuron weight vector is stored at address x in the weight memory, where x is calculated as follows:

$$x = \text{start\_address\_of\_weights} + \text{current\_layer} * \text{size\_of\_one\_weight\_set}, \quad \text{(Eq. 2)}$$

where start_address_of_weights is a base address in the weight memory where the first weight set is stored, which is likely 0, current_layer is the number of currently executed layer (starting with 0 for first layer), and where size_of_one_weight_set=number_of_weights_per_neuron*size_of_one_weight (e.g. 4 bit).

Once the proper neuron weight vector for the neuron 200 is determined, the neuron controller 202 provides the neuron weight vector to the neuron 200. If the current layer is the first layer and if the current neuron 200 is an input neuron, the neuron controller 202 also provides an external input (e.g., network input 108) to the neuron 200.

Before computing a respective neuron output for the neuron input, the analog computing unit 206 converts the neuron input from a digital format to an analog format using a Digital-to-Analog Converter (DAC) 208, and uses the converted neuron input in analog format for the computation.

To compute the respective neuron output, the analog computing unit 206 applies a non-linear function (e.g., output function in Eq. 1) on the neuron weight vector and the converted analog neuron input.

The neuron controller 202 controls the calculation of the output function in Eq. 1. The multiplication within the output function is implemented through a sequence of charging or discharging capacitors. The input value determines the starting charge. For each input component Input_i, the neuron controller 202 reads a corresponding weight in the neuron weight vector and clocks the analog computing unit 206 as often as the value of the weight. For example, in case the weight is 3, the neuron controller 202 clocks the analog computing unit 206 such that it charges a capacitor 3 times with the initial charge. In this way, the initial charge (representing the input value Input_i) is multiplied by 3. In case the weight is 0, the capacitor is not charged, which means the initial charge is multiplied by 0. In case of negative weight values, the analog computing unit performs discharge operations instead of charge operations.

In some implementations, all weights are stored as 4 bit values. One bit is a sign bit, the other three bits denote the value of the weight. Therefore, a possible set of weights is $\{-7, -6, -5, -4, -3, -2, -1, 0, 1, 2, 3, 4, 5, 6, 7\}$. The number of possible weights is a trade-off between accuracy of the analog neural network 110 and the size of the weight memory in each neuron.

Once the neuron output is obtained, the analog computing unit 206 provides the neuron output to all physical analog neurons of the single layer 116 for use in the next calculation cycle. At the last calculation cycle, which corresponds to the last layer of the multiple layers of the network 110, the analog computing unit 206 converts the neuron output from the analog format to a digital format using an Analog-to-Digital Converter (ADC) 210, and sends the digital neuron output to the neuron controller 202. Other neurons in the single layer 116 performs similar operations as the analog neuron 200 to derive their respective digital neuron outputs for the last calculation cycle. These digital neuron outputs are sent to the system controller 104. The system controller 104 then transmits these digital neuron outputs to the communication interface 102 as network output 106. The communication interface 102 then provides the network output 106 to the computer.

Figure 3:
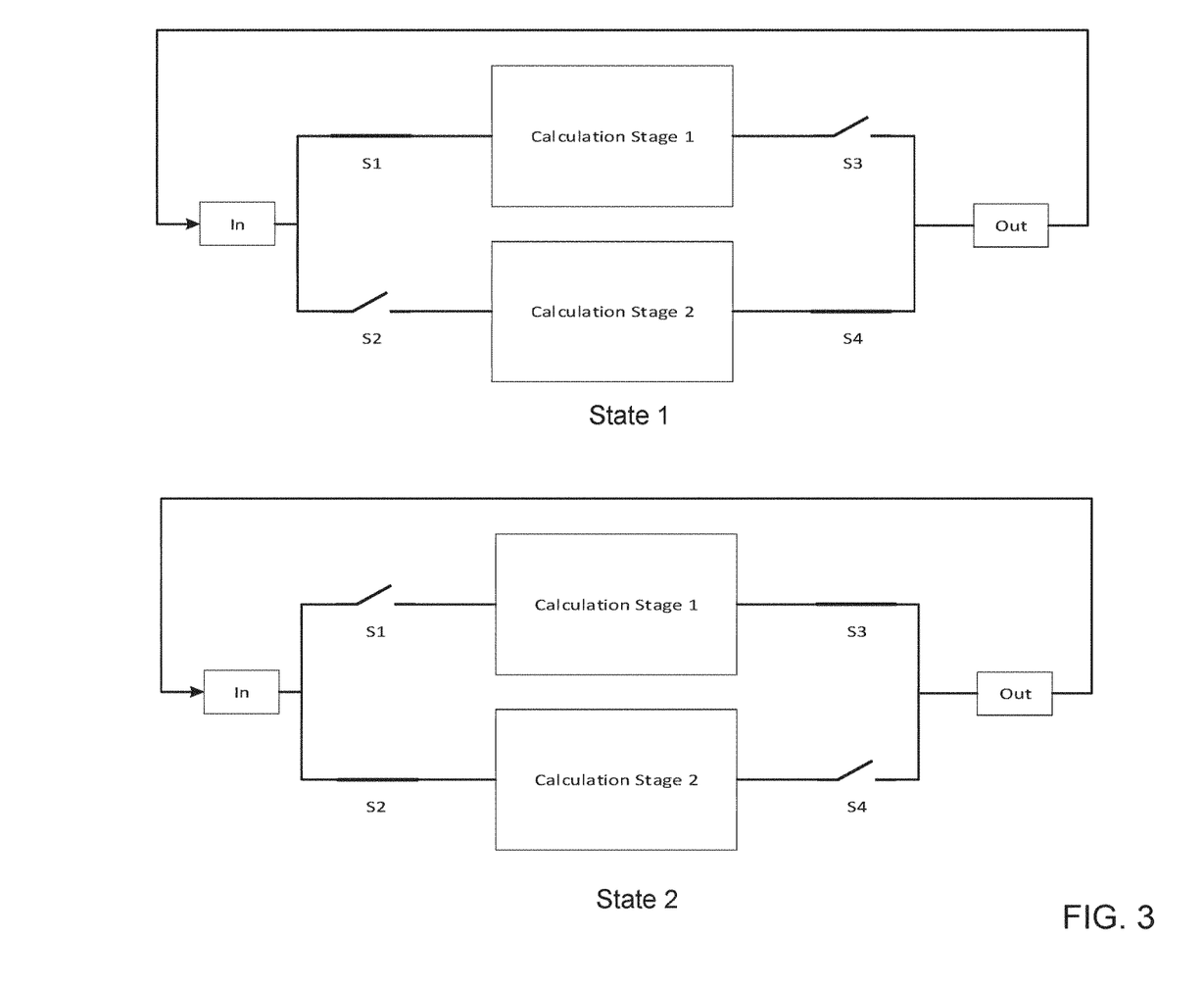
FIG. 3 illustrates an output buffering mechanism performed by an analog computing unit of an analog neuron.

FIG. 3 illustrates an output buffering mechanism performed by the analog computing unit of each analog neuron to allow each analog neuron buffers the neuron output while the next calculation is performed. To do this, an integrator and a charge pump are placed two times per neuron. While the first integrator acts as an output buffer, the second integrator calculates the next neuron output. Then the second integrator is switched to output buffer and the first integrator is calculating the next neuron output.

As shown in FIG. 3, two calculation stages (stage 1 and stage 2) and 4 switches S1, S2, S3, and S4 are used. For the 4 switches, there are only two states:

State 1: S1 closed, S2 open, S3 open, S4 closed
State 2: S1 open, S2 closed, S3 closed, S4 open The states are changed for each execution of a layer. For example, layer 1 is done in state 1, layer 2 in state 2, layer 3 in state 1, and so on.

In the calculation state 1, the input of the previous layer is provided by the calculation stage 2, and the new calculation is performed in the calculation stage 1.

In the calculation state 2, the input of the previous layer is provided by the calculation stage 1, and the new calculation is performed in the calculation stage 2.

The above output buffering mechanism ensures that there is always a stage to keep and provide the neuron output of the previous layer while the other stage is calculating the neuron output of the current layer. This output buffering mechanism is important for the speed and energy efficiency of a system that implements the multi-layer analog neural network described in this specification (e.g., the chip 100 of FIG. 1). Without this output buffering mechanism, the output data would need to be converted back to digital and send back to the neuron controllers for each layer. This would slow down operations and consume a significant amount of energy.

Figure 4:
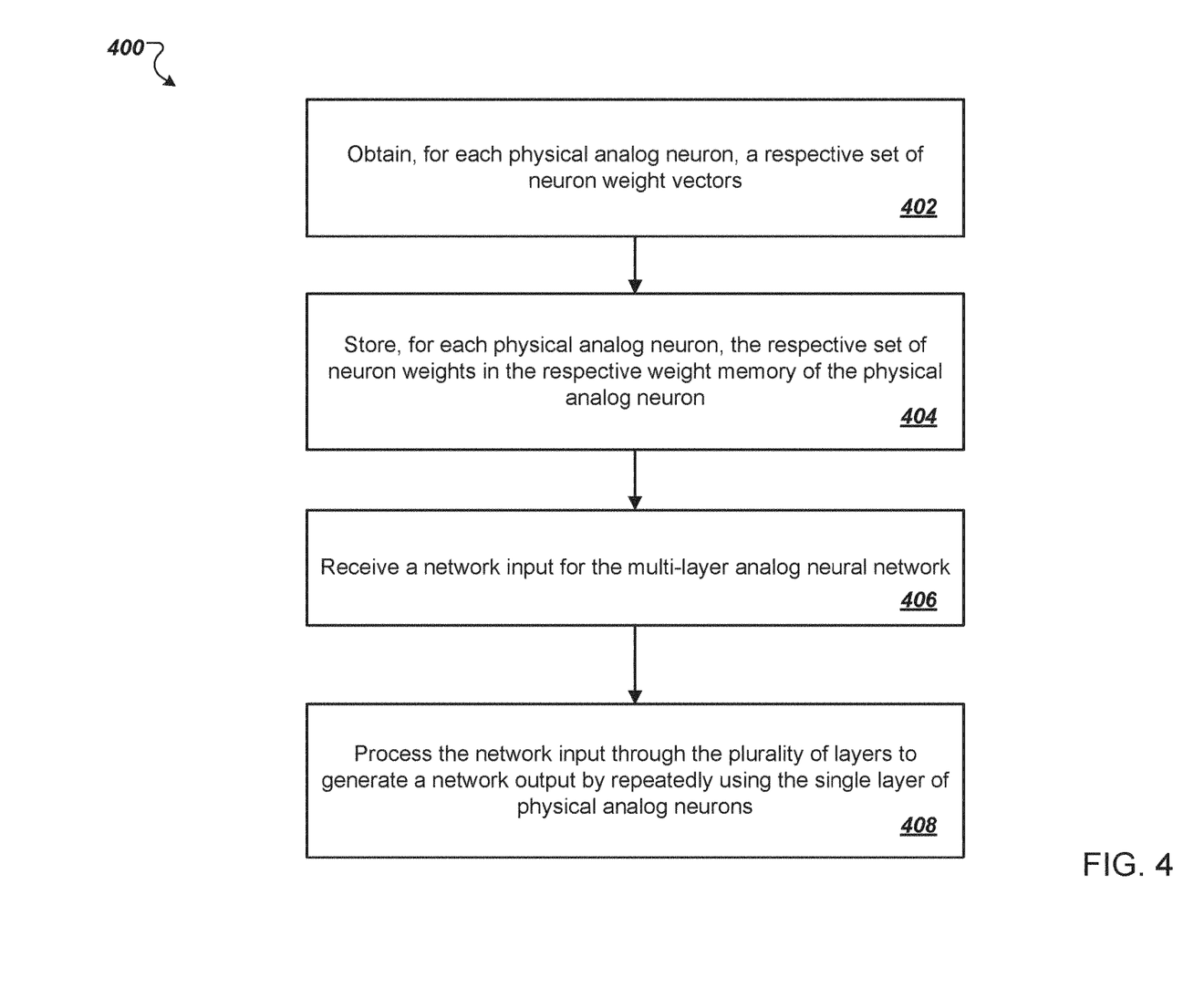
FIG. 4 is a flow diagram of an example process for generating a network output given a network input by using a multi-layer analog neural network implemented by a single layer of physical analog neurons.

FIG. 4 is a flow diagram of an example process 400 for generating a network output for a given network input by using a multi-layer analog neural network implemented by a single layer of physical analog neurons. For convenience, the process 400 will be described as being performed by a component of a chip. For example, a system controller, e.g., the system controller 104 of FIG. 1, appropriately programmed in accordance with this specification, can perform the process 400.

The system controller obtains, for each physical analog neuron, a respective set of neuron weight vectors with each neuron weight vector corresponding to a respective layer of plurality of layers of the multi-layer analog neural network (step 402).

The system controller stores, for each physical analog neuron, the respective set of neuron weights in the respective weight memory of the physical analog neuron (step 404).

The system controller receives a network input for the multi-layer analog neural network (step 406).

The system controller processes the network input through the plurality of layers to generate a network output by repeatedly using the single layer of physical analog neurons (step 408). For each layer of the plurality of layers, each of the physical analog neurons uses a neuron weight vector in the respective set of neuron weight vectors that corresponds the current layer to process the neuron input of the physical analog neuron.

In particular, to process the network input through the plurality of layers to generate the network output, the system executes a plurality of calculation cycles with each calculation cycle corresponding to a respective layer of the plurality of layers.

For each calculation cycle, the system sends data identifying the current layer to the neuron controller of each physical analog neuron.

The system then causes the neuron controller of each physical analog neuron of the single layer to synchronously (i) load a neuron weight vector corresponding to the current layer to the analog computing unit, and (ii) load a neuron input of the physical analog neuron for the current layer to the analog computing unit.

The analog computing unit converts the loaded neuron input from a digital format to an analog format using a Digital-to-Analog Converter (DAC).

The analog computing unit then computes a neuron output using the neuron weight vector and the converted analog neuron input, for example, by applying a non-linear function on the neuron weight vector and the converted analog neuron input. The analog computing unit then provides the computed neuron output of the physical analog neuron as input to all physical analog neurons of the single layer for the next calculation cycle.

At the last calculation cycle, which corresponds to the last layer (i.e., the output layer) of the multiple layers of the network, the analog computing unit converts the neuron output from the analog format to a digital format using an Analog-to-Digital Converter (ADC), and sends the digital neuron output to the neuron controller.

Once all of the calculation cycles are performed, the digital neuron outputs obtained from the neurons of the output layer are transmitted to the system controller as the final network output of the multi-layer analog neural network.

This specification uses the term "configured" or "operable" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A system comprising:
a multi-layer analog neural network having a single layer of physical analog neurons that is repeatedly re-usable for implementing a plurality of layers of the multi-layer analog neural network, wherein each of the physical analog neurons is configured to receive a neuron input and to process the neuron input to generate a neuron output that is fed as input to all physical analog neurons of the single layer, and wherein each of the physical analog neurons comprises a different respective weight memory;
a system controller operable to:
obtain, for each physical analog neuron, a respective set of neuron weight vectors with each neuron weight vector corresponding to a respective layer of the plurality of layers of the multi-layer analog neural network;
store, for each physical analog neuron, the respective set of neuron weights in the different respective weight memory of the physical analog neuron;
receive a network input for the multi-layer analog neural network; and
process the network input through the plurality of layers to generate a network output by repeatedly using the single layer of physical analog neurons, wherein for each layer of the plurality of layers, each of the physical analog neurons uses a neuron weight vector in the respective set of neuron weight vectors that corresponds to a current layer to process the neuron input of the physical analog neuron.

2. The system of claim 1, wherein each of the physical analog neurons further comprises a neuron controller and an analog computing unit, and
wherein the system controller is operable to process the network input through the plurality of layers to generate the network output by repeatedly using the single layer of physical analog neurons by:
executing a plurality of calculation cycles with each calculation cycle corresponding to a respective layer of the plurality of layers, wherein for each calculation cycle, the system controller is operable to:
cause the neuron controller of each physical analog neuron of the single layer to synchronously (i) load a neuron weight vector corresponding to the current layer to the analog computing unit, and (ii) load a neuron input of the physical analog neuron for the current layer to the analog computing unit;
cause the analog computing unit of each physical analog neuron to compute a neuron output using the loaded neuron weight vector and the loaded neuron input for the physical analog neuron; and
cause the neuron controller of each physical analog neuron to provide the computed neuron output of the physical analog neuron as input to all physical analog neurons of the single layer for the next calculation cycle.

3. The system of claim 2, wherein for each calculation cycle, the system controller is operable to send data identifying the current layer to the neuron controller of each physical analog neuron.

4. The system of claim 2, wherein for each calculation cycle, the system controller is operable to cause the neuron controller to convert the loaded neuron input from a digital format to an analog format using a Digital-to-Analog Converter (DAC).

5. The system of claim 2, wherein for each calculation cycle, the system controller is operable to cause the analog computing unit of each physical analog neuron to compute a neuron output using the loaded neuron weight vector and the loaded neuron input for the physical analog neuron by:
causing the analog computing unit of each physical analog neuron to apply a non-linear function on the loaded neuron weight vector and a converted analog neuron input to compute the neuron output.

6. The system of claim 5, wherein for the last calculation cycle corresponding to the last layer of the plurality of layer, the system controller is operable to cause the neuron controller of each physical analog neuron to convert the computed neuron output from an analog format to a digital format using an Analog-to-Digital Converter (ADC).

7. The system of claim 2, wherein each physical analog neuron comprises a capacitor;
wherein the analog computing unit computing the neuron output using the loaded neuron weight vector and the loaded neuron input for the physical analog neuron comprises the analog computing unit charging the capacitor for a respective physical analog neuron to store a voltage corresponding to a neuron weight from the respective weight memory.

8. The system of claim 1, wherein the weight memory in each of the physical analog neurons of the single layer is stored in random access memory (RAM).

9. The system of claim 1, wherein the neuron weight vector comprises a plurality of neuron weights, each neuron weight having an integer value.

10. A method for implementing a multi-layer analog neural network by repeatedly using a single layer of physical analog neurons, wherein each of the physical analog neurons is configured to receive a neuron input and to process the neuron input to generate a neuron output that is fed as input to all physical analog neurons of the single layer, and wherein each of the physical analog neurons comprises a different respective weight memory, the method comprising:

obtaining, for each physical analog neuron, a respective set of neuron weight vectors with each neuron weight vector corresponding to a respective layer of a plurality of layers of the multi-layer analog neural network;

storing, for each physical analog neuron, the respective set of neuron weights in the different respective weight memory of the physical analog neuron;

receiving a network input for the multi-layer analog neural network; and processing the network input through the plurality of layers to generate a network output by repeatedly using the single layer of physical analog neurons, wherein for each layer of the plurality of layers, each of the physical analog neurons uses a neuron weight vector in the respective set of neuron weight vectors that corresponds to a current layer to process the neuron input of the physical analog neuron.

11. The method of claim 10, wherein each of the physical analog neurons further comprises a neuron controller and an analog computing unit, and wherein processing the network input through the plurality of layers to generate the network output by repeatedly using the single layer of physical analog neurons comprises:

executing a plurality of calculation cycles with each calculation cycle corresponding to a respective layer of the plurality of layers, wherein for each calculation cycle, the method comprises:

causing the neuron controller of each physical analog neuron of the single layer to synchronously (i) load a neuron weight vector corresponding to the current layer to the analog computing unit, and (ii) load a neuron input of the physical analog neuron for the current layer to the analog computing unit;

causing the analog computing unit of each physical analog neuron to compute a neuron output using the loaded neuron weight vector and the loaded neuron input for the physical analog neuron; and causing the neuron controller of each physical analog neuron to provide the computed neuron output of the physical analog neuron as input to all physical analog neurons of the single layer for the next calculation cycle.

12. The method of claim 11, wherein for each calculation cycle, the method comprises: sending data identifying the current layer to the neuron controller of each physical analog neuron.

13. The method of claim 11, wherein for each calculation cycle, the method comprises: causing the neuron controller to convert the loaded neuron input from a digital format to an analog format using a Digital-to-Analog Converter (DAC).

14. The method of claim 11, wherein for each calculation cycle, causing the analog computing unit of each physical analog neuron to compute a neuron output using the loaded neuron weight vector and the loaded neuron input for the physical analog neuron comprises:

causing the analog computing unit of each physical analog neuron to apply a non-linear function on the loaded neuron weight vector and a converted analog neuron input to compute the neuron output.

15. The method of claim 14, wherein for the last calculation cycle corresponding to the last layer of the plurality of layers, the method comprises:

causing the neuron controller of each physical analog neuron to convert the computed neuron output from an analog format to a digital format using an Analog-to-Digital Converter (ADC).

16. The method of claim 10, wherein storing, for each physical analog neuron, the respective set of neuron weights in the respective weight memory of the physical analog neuron comprises:

storing, for each physical analog neuron, the respective set of neuron weights in random access memory (RAM) of the physical analog neuron.

17. A multi-layer analog neural network comprising:

a single layer of physical analog neurons that is usable for implementing a plurality of layers of the multi-layer analog neural network by repeatedly re-using the single layer of physical analog neurons, wherein each of the physical analog neurons is configured to receive a neuron input and to process the neuron input to generate a neuron output that is fed as input to all physical analog neurons of the single layer, wherein each of the physical analog neurons comprises:
a different respective weight memory;
a neuron controller; and
and an analog computing unit;

a system controller operable to:
obtain, for each physical analog neuron, a respective set of neuron weight vectors with each neuron weight vector corresponding to a respective layer of the plurality of layers of the multi-layer analog neural network;

store, for each physical analog neuron, the respective set of neuron weights in the different respective weight memory of the physical analog neuron;

receive a network input for the multi-layer analog neural network; and process the network input through the plurality of layers to generate a network output by repeatedly using the single layer of physical analog neurons, wherein for each layer of the plurality of layers, each of the physical analog neurons uses a neuron weight vector in the respective set of neuron weight vectors that corresponds to a current layer to process the neuron input of the physical analog neuron;

wherein the system controller is further operable to process the network input through the plurality of layers to generate the network output by repeatedly using the single layer of physical analog neurons by executing a plurality of calculation cycles with each calculation cycle corresponding to a respective layer of the plurality of layers, wherein for each calculation cycle, the system controller is operable to:

cause the neuron controller of each physical analog neuron of the single layer to synchronously (i) load a neuron weight vector corresponding to the current layer to the analog computing unit, and (ii) load a neuron input of the physical analog neuron for the current layer to the analog computing unit;

cause the analog computing unit of each physical analog neuron to compute a neuron output using the loaded neuron weight vector and the loaded neuron input for the physical analog neuron; and cause the neuron controller of each physical analog neuron to provide the computed neuron output of the physical analog neuron as input to all physical analog neurons of the single layer for the next calculation cycle.

18. The multi-layer analog neural network of claim 17, wherein each physical analog neuron further comprises: an analog multiplier to store a voltage corresponding to a neuron weight from the respective weight memory.

19. The multi-layer analog neural network of claim 18, wherein the analog multiplier is a capacitor.

20. The multi-layer analog neural network of claim 17, wherein the weight memory in each of the physical analog neurons of the single layer is stored in a random access memory (RAM).

* * * * *